(12) United States Patent
Lin et al.

(10) Patent No.: US 10,797,307 B2
(45) Date of Patent: Oct. 6, 2020

(54) METHOD FOR MANUFACTURING SILICON FLAKES, SILICON-CONTAINING NEGATIVE ELECTRODE AND METHOD FOR MANUFACTURING THE SAME

(71) Applicant: AUO Crystal Corporation, Taichung (TW)

(72) Inventors: Kun-Fung Lin, Taipei (TW); Rong-Ruey Jeng, Taoyuan (TW); Han-Tu Lin, Hsinchu County (TW); Chih-Hung Chan, Taoyuan (TW)

(73) Assignee: AUO Crystal Corporation, Taichung (TW)

( * ) Notice: Subject to any disclaimer, the term of this patent is extended or adjusted under 35 U.S.C. 154(b) by 0 days.

(21) Appl. No.: 15/869,061

(22) Filed: Jan. 12, 2018

(65) Prior Publication Data
US 2018/0138500 A1  May 17, 2018

Related U.S. Application Data

(63) Continuation of application No. 14/303,620, filed on Jun. 13, 2014, now Pat. No. 9,905,845.

(30) Foreign Application Priority Data

Sep. 16, 2013 (TW) .............................. 102133528 A

(51) Int. Cl.
| | |
|---|---|
| *H01M 4/00* | (2006.01) |
| *H01M 4/1395* | (2010.01) |
| *H01M 4/134* | (2010.01) |
| *H01M 4/36* | (2006.01) |
| *H01M 4/38* | (2006.01) |
| *H01M 10/0525* | (2010.01) |

(52) U.S. Cl.
CPC ......... *H01M 4/1395* (2013.01); *H01M 4/134* (2013.01); *H01M 4/364* (2013.01); *H01M 4/386* (2013.01); *H01M 4/387* (2013.01); *H01M 10/0525* (2013.01)

(58) Field of Classification Search
CPC .. H01M 4/1395; H01M 4/1347; H01M 4/364; H01M 4/386; H01M 4/384; H01M 10/0525
See application file for complete search history.

(56) References Cited

U.S. PATENT DOCUMENTS

2009/0053589 A1*  2/2009  Obrovac .............. H01M 4/134
                                                    429/149
2014/0170303 A1*  6/2014  Rayner .................... C25D 1/00
                                                    427/58

* cited by examiner

*Primary Examiner* — Jane J Rhee
(74) *Attorney, Agent, or Firm* — CKC & Partners Co., LLC

(57) ABSTRACT

A method for manufacturing silicon flakes includes steps as follows. A silicon material is contacted with a machining tool which includes at least one abrasive particle fixedly disposed thereon. The silicon material is scraped along a displacement path with respect to the machining tool to generate the silicon flakes having various particle sizes.

19 Claims, 14 Drawing Sheets

--- a silicon material is contacted with a machining tool, wherein the machining tool includes a plurality of abrasive particle fixedly disposed thereon ── 100 the silicon material is scraped along a displacement path with respect to the machine tool to generate the silicon flakes having various particle sizes ── 200 the silicon flakes are consolidated to form the silicon-containing negative electrode of the secondary lithium ion battery ── 300

METHOD FOR MANUFACTURING SILICON FLAKES, SILICON-CONTAINING NEGATIVE ELECTRODE AND METHOD FOR MANUFACTURING THE SAME

RELATED APPLICATIONS

The present application is a continuation of the application Ser. No. 14/303,620, filed Jun. 13, 2014, which claims priority to Taiwan Application Serial Number 102133528, filed Sep. 16, 2013, which is herein incorporated by reference.

BACKGROUND

Technical Field

The present disclosure relates to a battery material and a method for manufacturing the same. More particularly, the present disclosure relates to an electrode material of a lithium ion battery and a method for manufacturing the same.

Description of Related Art

In recent years, with the development of 3C electronics, lightweight, mobile and high-energy batteries have attracted considerable attention. Among the high-energy batteries, lithium ion batteries have developed most maturely and been widely applied to portable electronics. For example, a smart phone evolves not only toward large size color screen, but also with more and more complicated functionalities of photo shooting and music playing. As a result, a demand for lightweight high-energy batteries is increasing. How to increase a capacity and a cycle life of the lithium ion batteries has become an important subject.

In the known technical solutions, a commonly used negative electrode material of the lithium ion batteries is a graphite-based material, such as a graphite carbon material. The graphite-based material has an excellent charge and discharge capacity, and no dendritic structure is generated, so that the graphite-based material is safer in performance. However, the structure of the negative electrode made of graphite-based material is spoiled due to the reversibly insertion and detachment of lithium ions after a number of charging and discharging cycles. Accordingly, the cycle life of the lithium ion batteries is influenced. Furthermore, a theoretical charge capacity of graphite is only about 372 mAh/g, and the development of the lithium ion batteries is limited thereby.

A lot of researches for improving the negative electrode material of the lithium ion batteries have been provided. For example, silicon material is mixed into the negative electrode of the lithium ion batteries. A theoretical capacity of the silicon material is about 4200 mAh/g, which is the highest among the materials applied to the negative electrode of the lithium ion batteries. However, a phase change is caused by the reversibly insertion and detachment of lithium ions, and a volume expansion is generated thereby. The volume expansion is so large that the cycling stability and irreversibility of the silicon-containing negative electrode of the lithium ion batteries are seriously influenced.

Minimizing the particle sizes of the silicon material is one of the solutions for controlling the volume expansion. For example, the particle sizes of the silicon material are minimized to the range of 10~300 nm. Although it is common to control the volume expansion by minimizing the particle sizes of the silicon material to the nanoscale. The silicon material in the form of nanoscale particles is very expensive. Also, a significant irreversible capacity is caused due to a larger surface area of the nanoscale particles. Importantly, the nanoscale particles with similar sizes and shapes tend to aggregate with each other to form larger particles, and the process of uniformly mixing the materials to form the negative electrode becomes more difficult.

A columnar silicon material for reducing the volume expansion is disclosed. The particle sizes of the columnar silicon material are in a range of 10 μm to 800 μm. The columnar silicon material is formed by a chemical method including an etching step and a nucleating step. However, the formed columnar silicon material has to be removed from a substrate, such that the chemical method has a high cost and low manufacturing rate. Furthermore, the particle sizes of the columnar silicon material are limited by the chemical method, and the consistency of the sizes of the columnar silicon material intensifies the aggregation of the columnar silicon material. Therefore, a subsequent dispersion process is required for the columnar silicon material.

Given the above, how to obtain an environmental friendly silicon material, which is low cost and the volume expansion thereof can be well controlled, has become the important subject for the relevant industry of the lithium ion batteries.

SUMMARY

According to one aspect of the present disclosure, a method for manufacturing silicon flakes includes steps as follows. A silicon material is contacted with a machining tool. The machining tool includes at least one abrasive particle fixedly disposed thereon. The silicon material is scraped along a displacement path with respect to the machining tool to generate a plurality of silicon flakes having various particle sizes.

According to another aspect of the present disclosure, a method for manufacturing a silicon-containing negative electrode of a lithium ion battery includes steps as follows. A silicon material is contacted with a machining tool. The machining tool includes at least one abrasive particle fixedly disposed thereon. The silicon material is scraped along a displacement path with respect to the machining tool to generate a plurality of silicon flakes having various particle sizes. The silicon flakes are consolidated to form the silicon-containing negative electrode of the lithium ion battery.

According to further another aspect of the present disclosure, a silicon-containing negative electrode of a lithium ion battery is disclosed. The silicon-containing negative electrode of the lithium ion battery is manufactured by the aforementioned method. The silicon-containing negative electrode of the lithium ion battery includes the silicon flakes and an active material. An amount of the silicon flakes is equal to or greater than 5 parts by weight based on 100 parts by weight of the silicon-containing negative electrode. The silicon flakes have various particle sizes in a range of 50 nm to 9 μm. The active material is graphite, a metal element or a metal compound.

According to yet another aspect of the present disclosure, a silicon-containing negative electrode of a lithium ion battery is disclosed. The silicon-containing negative electrode of the lithium ion battery is manufactured by the aforementioned method. The silicon-containing negative electrode is substantially composed of the silicon flakes. The silicon flakes have various particle sizes in a range of 50 nm to 9 μm.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
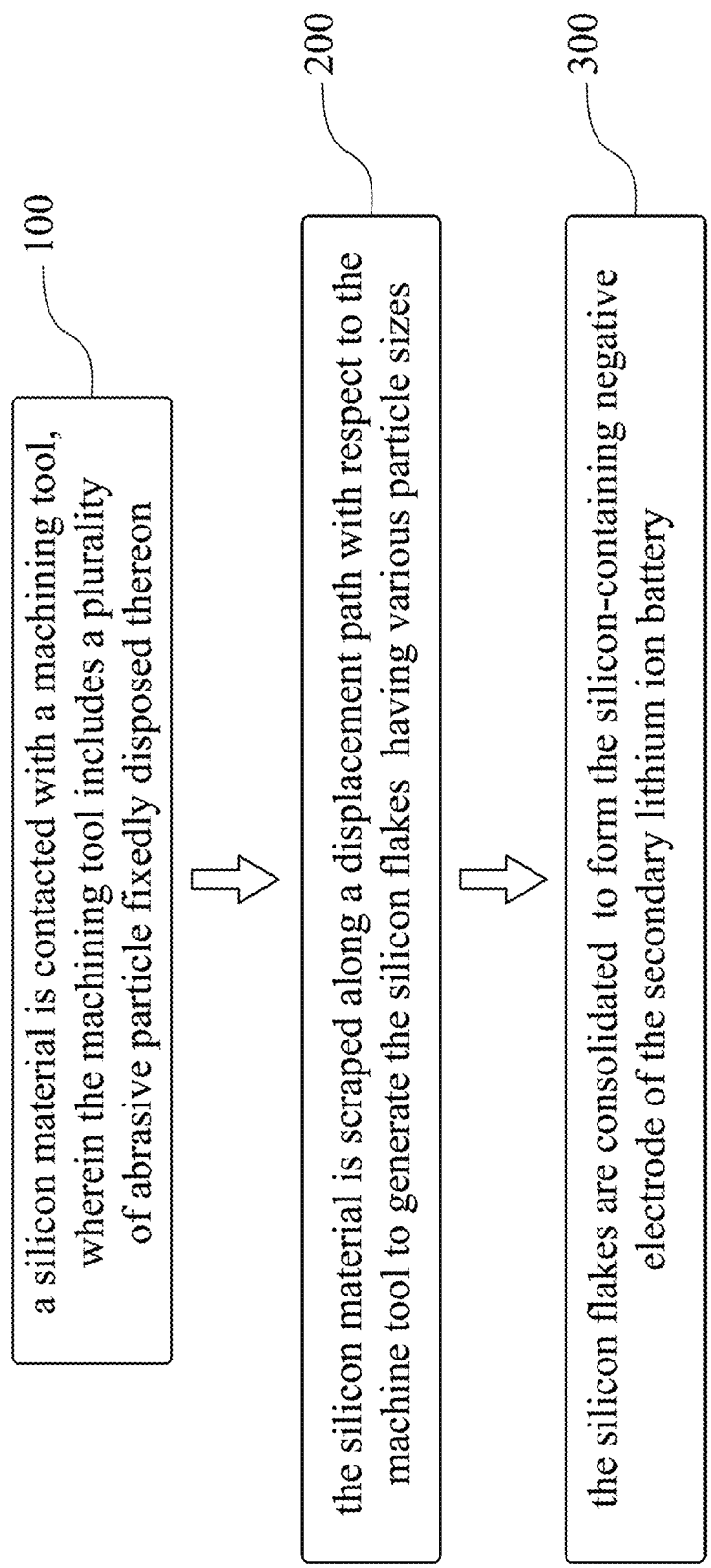
FIG. 1 is a flow diagram showing a method for manufacturing a silicon-containing negative electrode of a lithium ion battery according to one embodiment of the present disclosure.
Figure 1C:
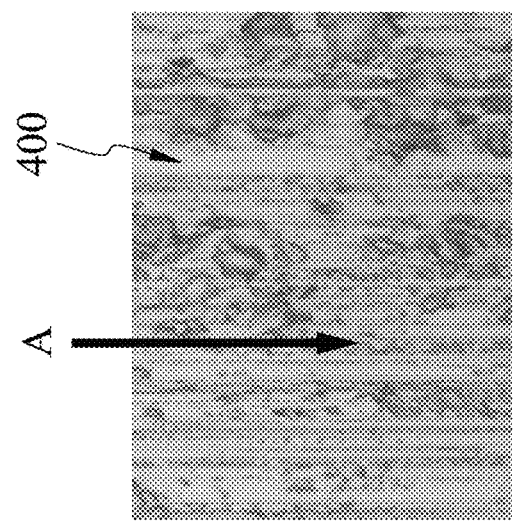
FIG. 1C is a SEM photomicrograph of the surface of the silicon material in FIG. 1A taken at 100 times magnification.
Figure 1B:
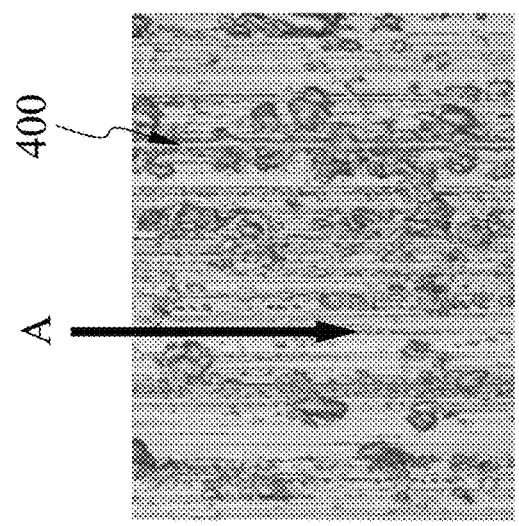
FIG. 1B is a SEM photomicrograph of the surface of the silicon material in FIG. 1A taken at 50 times magnification.
Figure 1A:
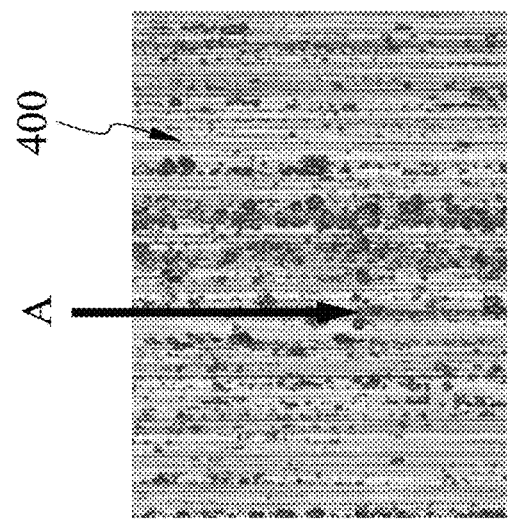
FIG. 1A is a SEM (scanning electron microscope) photomicrograph of a surface of a silicon material after constantly scraped by a machining tool according to the method in FIG. 1 taken at 20 times magnification.
Figure 2:
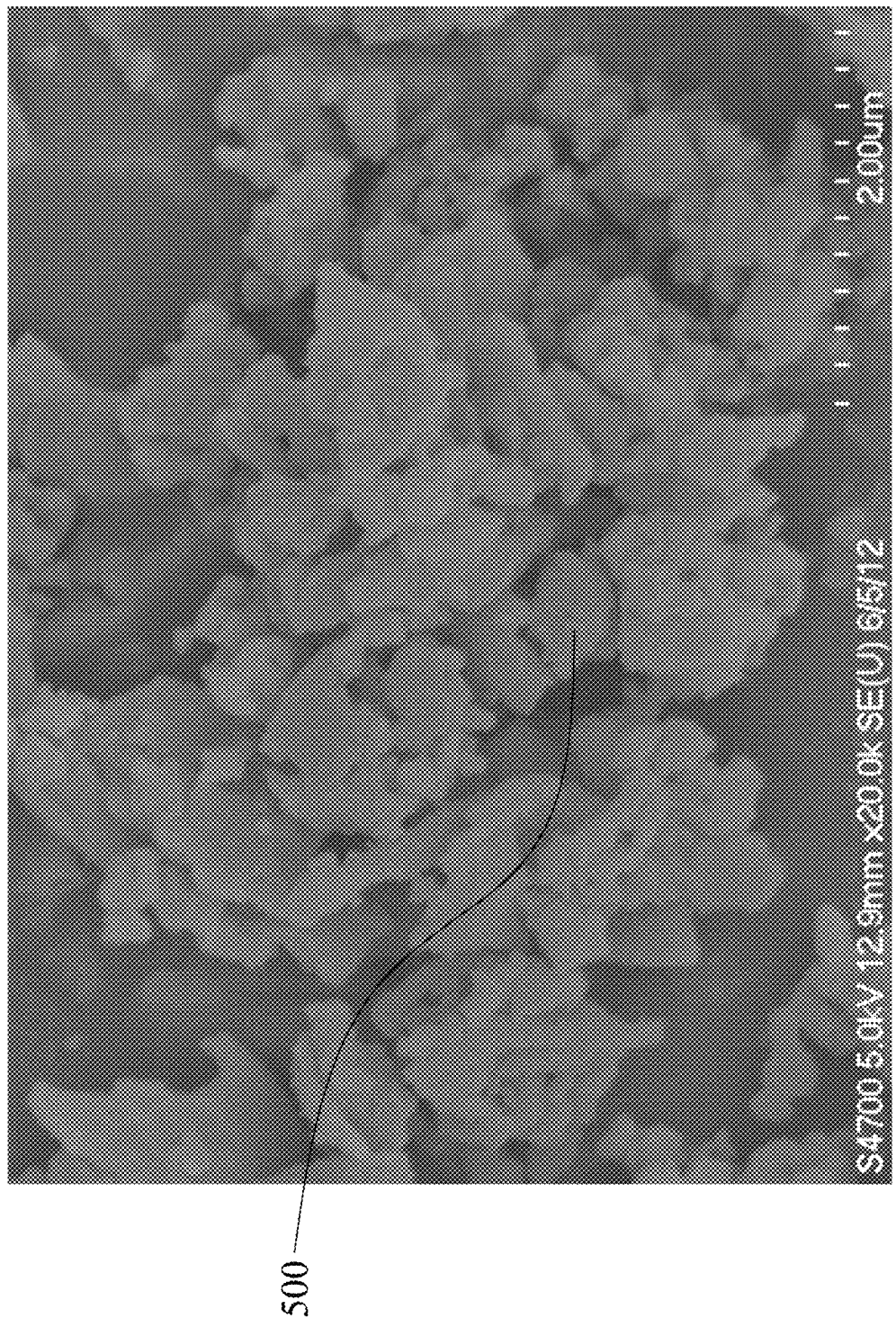
FIG. 2 is a SEM photomicrograph of a plurality of silicon flakes manufactured by the method in FIG. 1.
Figure 3:
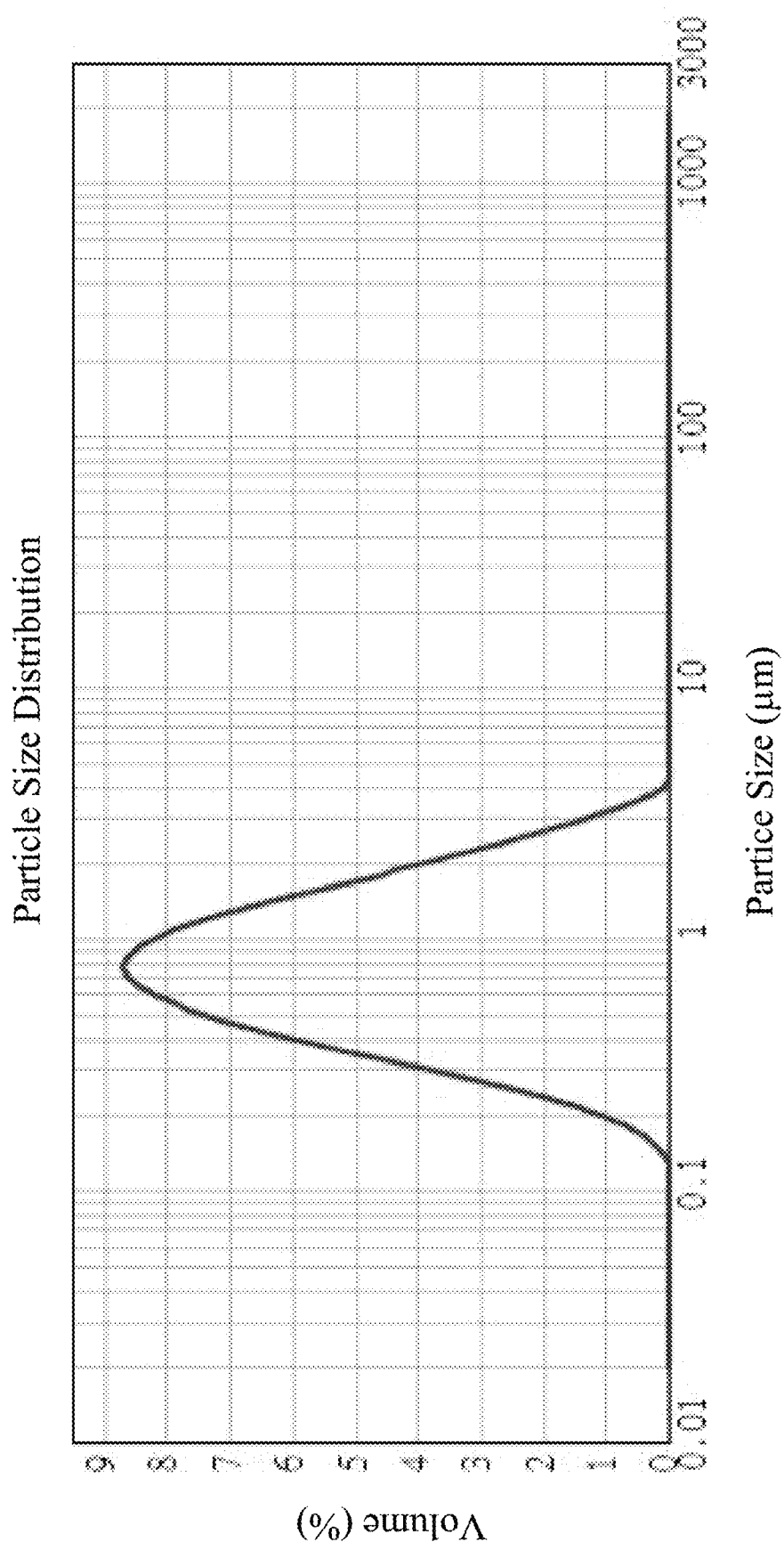
FIG. 3 shows a particle size distribution of the silicon flakes manufactured by the method in FIG. 1.
Figure 4:
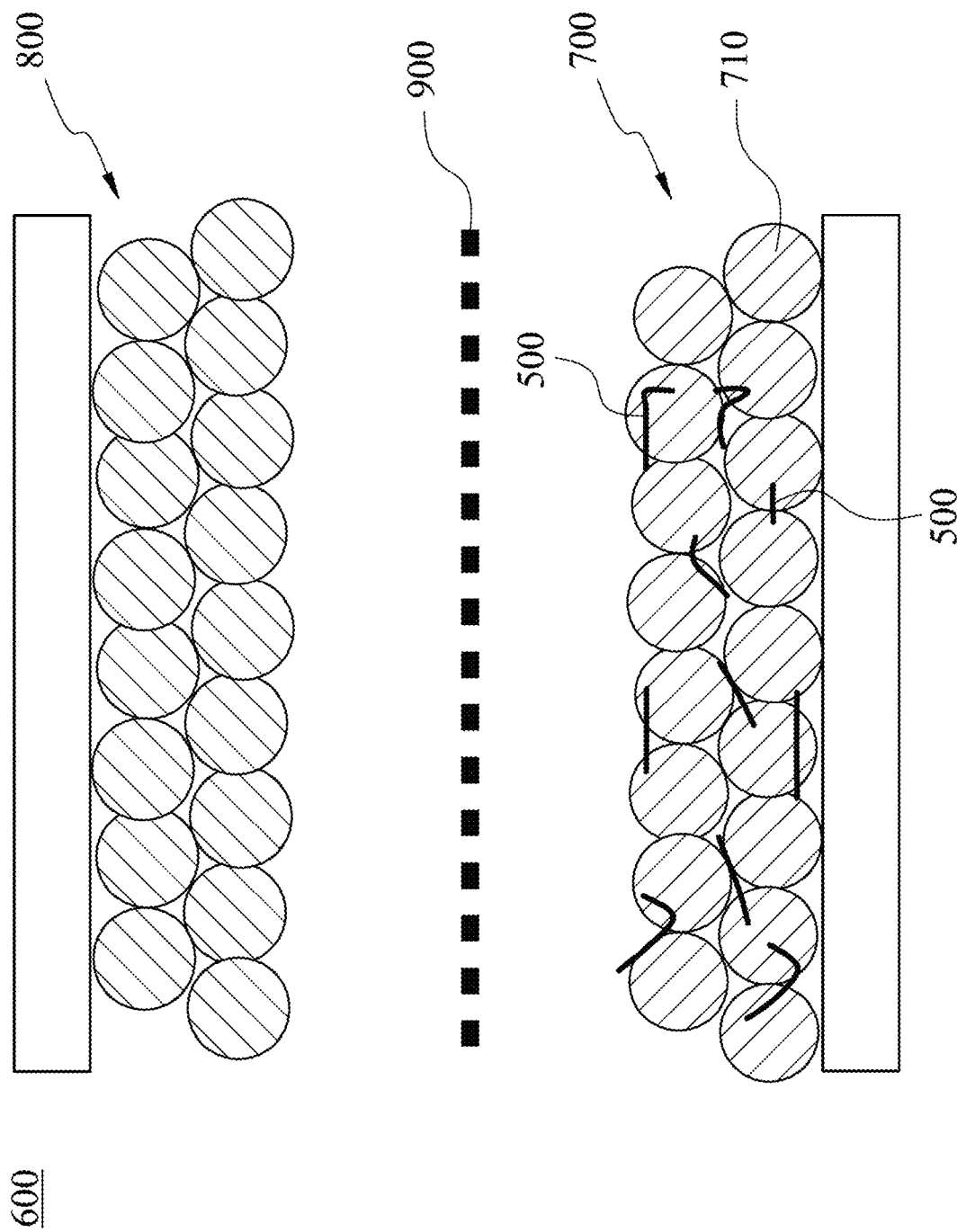
FIG. 4 is a schematic view of a silicon-containing negative electrode of a lithium ion battery according to one embodiment of the present disclosure.

Method for Manufacturing Silicon Flakes of a Silicon-Containing Negative Electrode of a Lithium Ion Battery FIG. 1 is a flow diagram showing a method for manufacturing a silicon-containing negative electrode 700 of a lithium ion battery 600 according to one embodiment of the present disclosure. FIG. 1A-FIG. 1C are SEM photomicrographs of a surface of a silicon material 400 after constantly scraped by a machining tool according to the method in FIG. 1, and FIG. 1A-FIG. 1C are taken at 20 times magnification, 50 times magnification and 100 times magnification respectively. FIG. 2 is a SEM photomicrograph of a plurality of silicon flakes 500 manufactured by the method in FIG. 1. FIG. 3 shows a particle size distribution of the silicon flakes 500 manufactured by the method in FIG. 1. FIG. 4 is a schematic view of the silicon-containing negative electrode 700 of the lithium ion battery 600 according to one embodiment of the present disclosure.

The method for manufacturing the silicon-containing negative electrode 700 of the lithium ion battery 600 includes steps as follows.

In Step 100, the silicon material 400 is contacted with the machining tool, wherein the machining tool includes a plurality of abrasive particle fixedly disposed thereon. For examples, the machining tool can be a wire saw, a band saw or a grinding disc. The abrasive particles can be natural diamonds, artificial diamonds, cubic boron nitride, silicon carbide, aluminum oxide or cerium oxide In Step 200, the silicon material 400 is scraped along a displacement path A (shown in FIG. 1A, FIG. 1B and FIG. 1C) with respect to the machine tool to generate the silicon flakes 500 having various particle sizes. The displacement path A is a straight line. As shown in FIG. 1A, FIG. 1B and FIG. 1C, a large number of the silicon flakes 500 are generated, and the silicon flakes 500 have various particle sizes. As shown in FIG. 2, a thickness of each of the silicon flakes 500 along a short axis thereof is 50 nm to 200 nm. The aforementioned "a short axis" means that each of the silicon flakes 500 is substantially an oblong flake and has a thickness, and the short axis is along a thickness direction of the oblong flake. As shown in FIG. 3, a range of the particle sizes of the silicon flakes 500 is about 50 nm to 9 μm, and the particle sizes of the silicon flakes 500 are concentrated in a range of 300 nm to 2 μm.

Furthermore, the displacement path A is not limited to a straight line. In another embodiment, the displacement path A can be a curve line. When the silicon material 400 is repeatedly scraped by the machining tool, the machining tool can back and forth scrape the silicon material 400 along the displacement path, or the machining tool can scrape the silicon material 400 along the displacement path in one way.

In Step 300, the silicon flakes 500 are consolidated to form the silicon-containing negative electrode 700 of the lithium ion battery 600. Therefore, the manufacturing costs of the silicon-containing negative electrode 700 of the lithium ion battery 600 are reduced via the mechanical method for manufacturing the silicon flakes 500, and the problem of volume expansion is preferably resolved via the inconsistencies of the particle sizes and shapes of the silicon flakes 500. Furthermore, the aggregation characteristic of the silicon flakes 500 can be reduced due to the inconsistencies of the particle sizes and shapes of the silicon flakes 500.

In Step 300, the silicon flakes 500 are used to form the silicon-containing negative electrode 700 of the lithium ion battery 600, which is only one of the applications of the silicon flakes 500. In other embodiments, the silicon flakes 500 can be used to manufacture other kinds of batteries.

Figure 5:
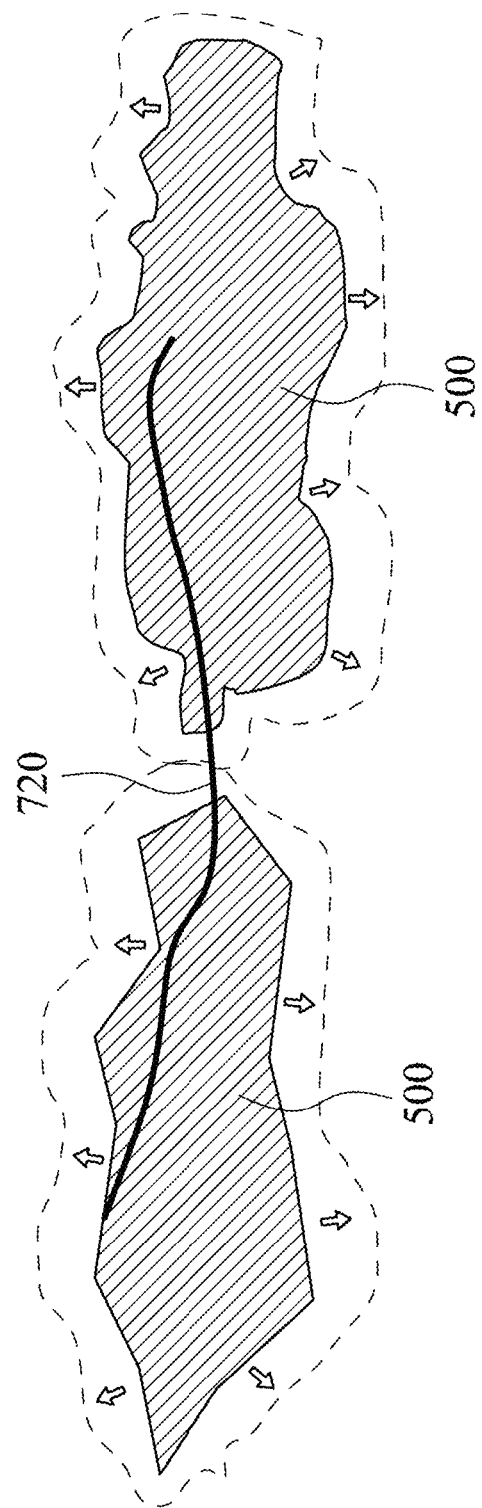
FIG. 5 is a partial enlarged schematic view showing a microscopic state of FIG. 4.
Figure 6A:
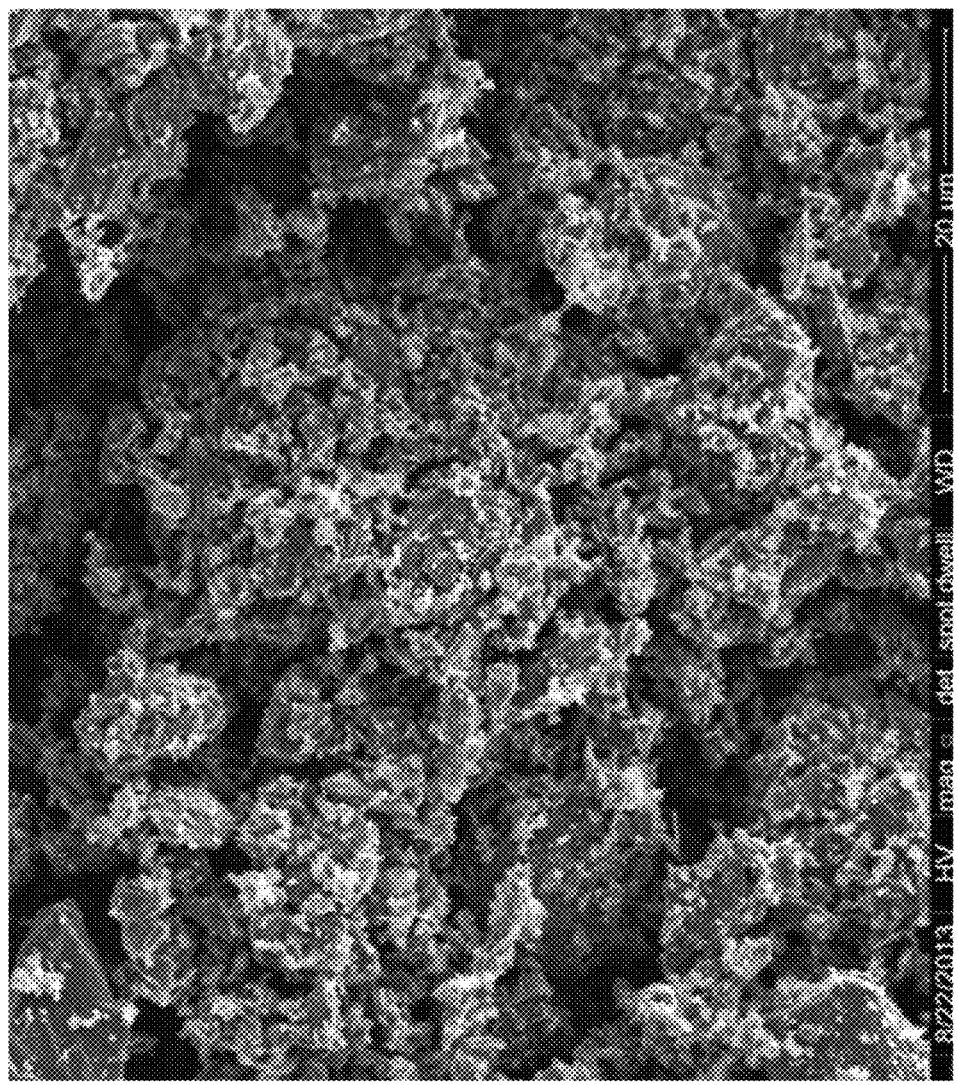
FIG. 6A is a SEM photomicrograph of a silicon-containing negative electrode of a lithium ion battery according to the 1st example of the present disclosure.

Method for Manufacturing a Silicon-Containing Negative Electrode of a Lithium Ion Battery Please refer to FIG. 4, FIG. 5 and FIG. 6A. FIG. 5 is a partial enlarged schematic view showing a microscopic state of FIG. 4. FIG. 6A is a SEM photomicrograph of a silicon-containing negative electrode 700 of a lithium ion battery 600 according to the 1st example of the present disclosure. In FIG. 4, the lithium ion battery 600 includes the silicon-containing negative electrode 700, a positive electrode 800 and a separator 900. The silicon-containing negative electrode 700 is opposite to the positive electrode 800, and the separator 900 is disposed between the silicon-containing negative electrode 700 and the positive electrode 800. The silicon-containing negative electrode 700 is manufactured by the aforementioned method. Specifically, the silicon-containing negative electrode 700 includes the silicon flakes 500, binders 720, conductive agents and active materials 710. The active materials 710 can be graphite, all kinds of carbon materials, a metal element or a metal compound. The metal element can be but not limited to tin, nickel, titanium, manganese, copper, magnesium and a combination thereof. The metal compound can be but not limited to titanium carbide, silicon carbide or titanate. In the 1st example, the active materials 710 are graphite. The silicon flakes 500, binders 720, conductive agents and active materials 710 are mixed in an appropriate proportion so as to form a uniform mixture, and the uniform mixture is coated on a copper electrode plate so as to form the silicon-containing negative electrode 700. The electrolyte used in the lithium ion battery 600 can be but not limited to $LiPF_6$. The binders 720 can be CMC (carboxymethyl cellulose), SBR (styrene-butadiene rubber) or PAA (polyacrylic acid). The conductive agents can be but not limited to KS-6 or Super-P.

Based on 100 parts by weight of the silicon-containing negative electrode 700, an amount of the silicon flakes 500 is equal to or greater than 5 parts by weight. Preferably, based on 100 parts by weight of the silicon-containing negative electrode 700, the amount of the silicon flakes 500 is 5 parts by weight to 80 parts by weight. More preferably, based on 100 parts by weight of the silicon-containing negative electrode 700, the amount of the silicon flakes 500 is 10 parts by weight to 20 parts by weight.

In the silicon-containing negative electrode 700, the silicon flakes 500 are dispersed among the active materials 710. Although a silicon material has a high theoretical capacity which is up to 4200 mAh/g. However, the problem of volume expansion exited in the silicon material endangers the performance of the silicon material. The problem of volume expansion has been overcome by the shapes and particle sizes of the silicon flakes 500 according to the present disclosure. The range of the particle sizes of the silicon flakes 500 according to the present disclosure is 50 nm to 9 μm, and the thickness of each of the silicon flakes 500 along the short axis thereof is 50 nm to 200 nm. As a result, the amount of volume expansion (as the expanding directions indicated by the arrows shown in FIG. 5) along a long axis direction is reduced. Furthermore, each of the silicon flakes 500 has a larger surface for bonding with the binder 720. Therefore, the generation of the cracks of the silicon-containing negative electrode 700 due to volume expansion is reduced, and the capacity of the lithium ion battery 600 is increased accordingly. In other words, the capacity and the lifetime of the lithium ion battery 600 are both increased.

Experiment Result of Lithium Ion Battery—1st Example

Figure 6B:
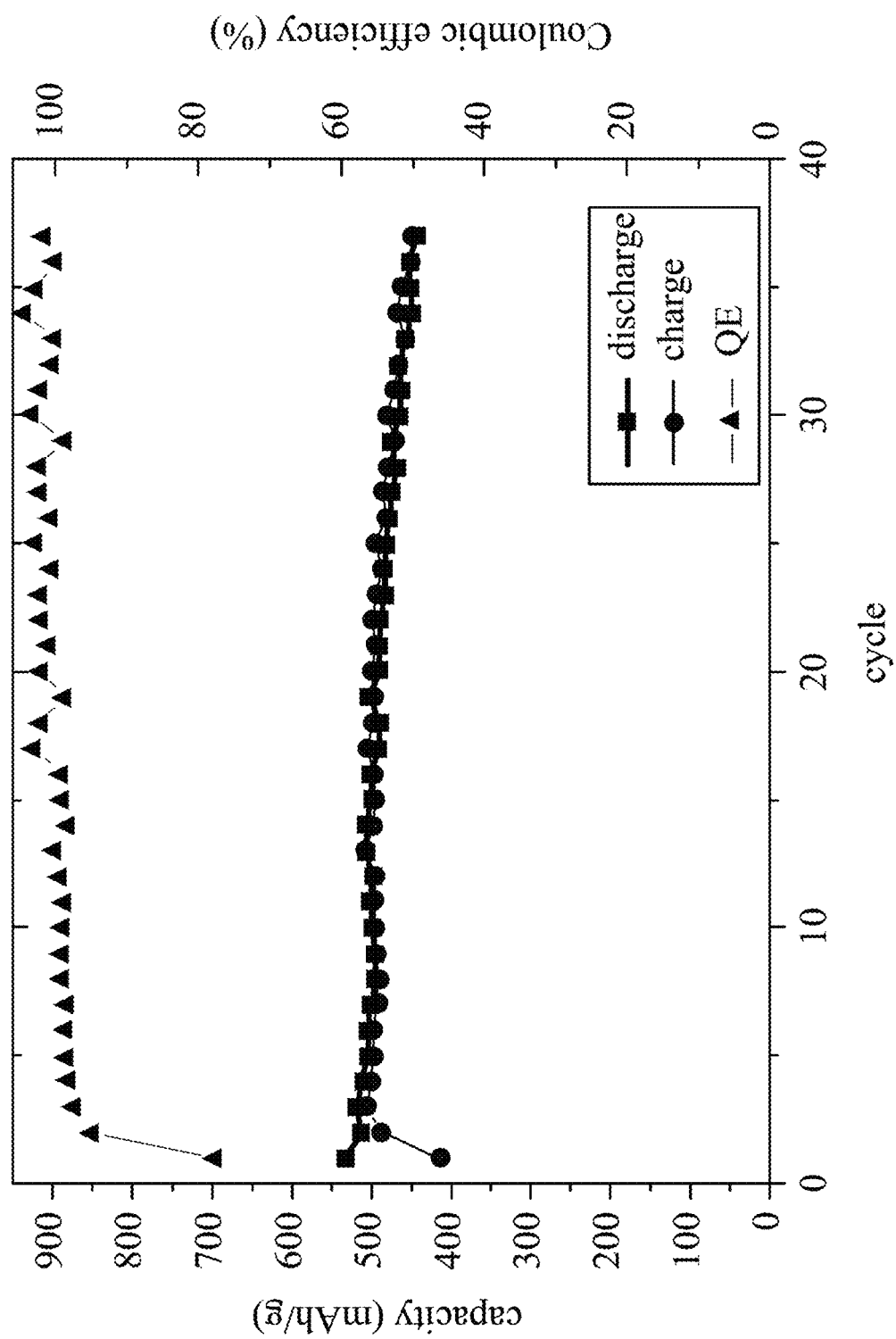
FIG. 6B shows Coulombic efficiency and charge/discharge capacity versus cycle number of the lithium ion battery according to the 1st example.

Please refer to FIG. 6A and FIG. 6B. FIG. 6B shows Coulombic efficiency and charge/discharge capacity versus cycle number of the lithium ion battery 600 according to the 1st example.

In the 1st example, based on 100 parts by weight of the silicon-containing negative electrode 700, an amount of the silicon flakes 500 is equal to 12 parts by weight. In FIG. 6B, the capacity of the lithium ion battery 600 is measured by a battery automation test system, and the model number of the battery automation test system is BAT-750B. The charge-discharge tests are conducted for 40 cycles, and the charge-discharge tests are conducted under a fixed charge/discharge rate of 0.1 C and a cut-off voltage of 20 mV~1.2 V. The relationships between voltage and time are recorded by a computer. In FIG. 6B, the QE value of the 1st cycle is 77.7%. The charge capacity of the 1st cycle is 413.8 mAh/g, the charge capacity of the 37th cycle is 450.7 mAh/g, and the capacity retention of the 37th cycle is up to 108.9%.

Experiment Result of Lithium Ion Battery—2nd Example

Figure 7A:
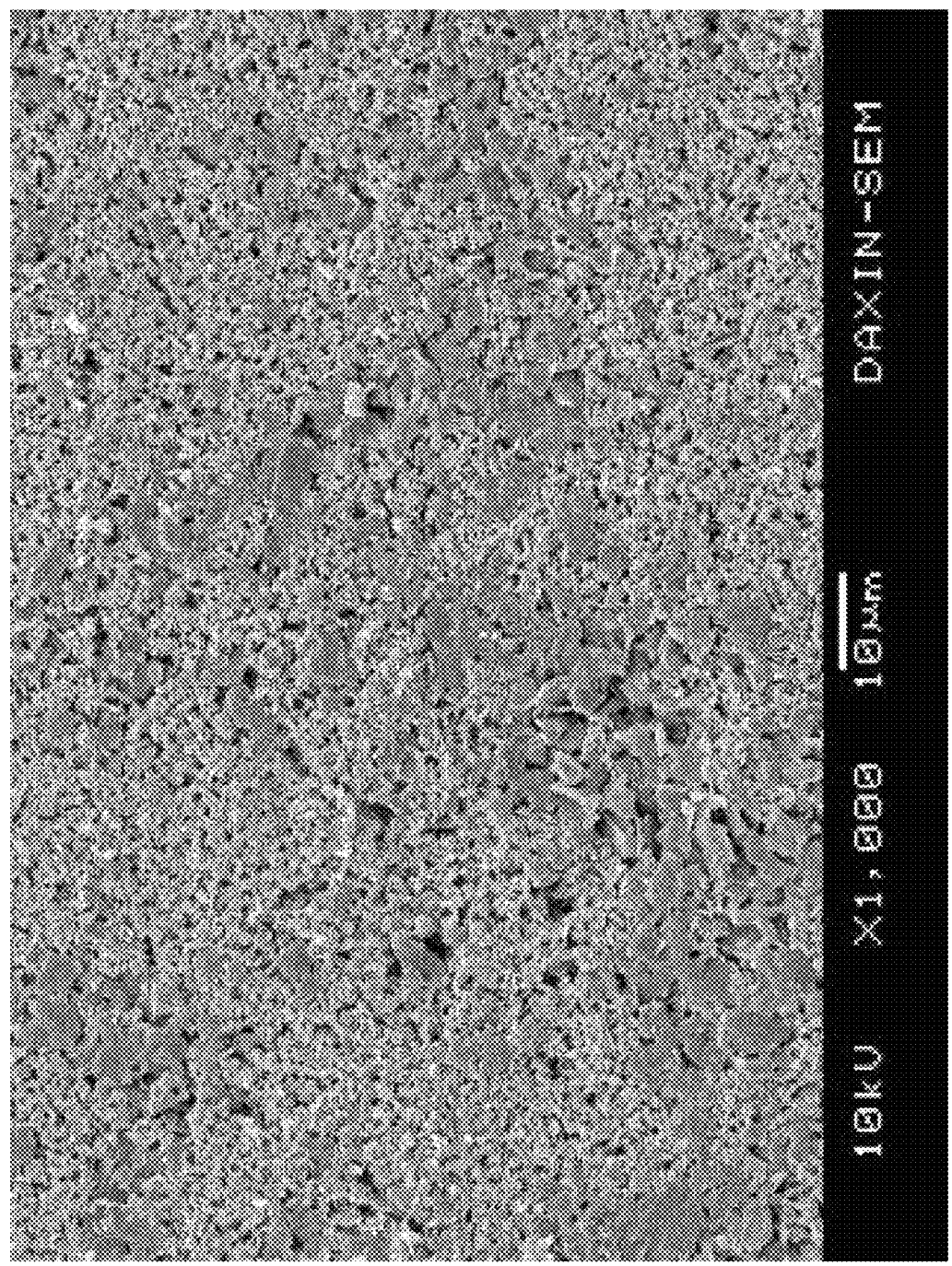
FIG. 7A is a SEM photomicrograph of a silicon-containing negative electrode of a lithium ion battery according to the 2nd example of the present disclosure.
Figure 7B:
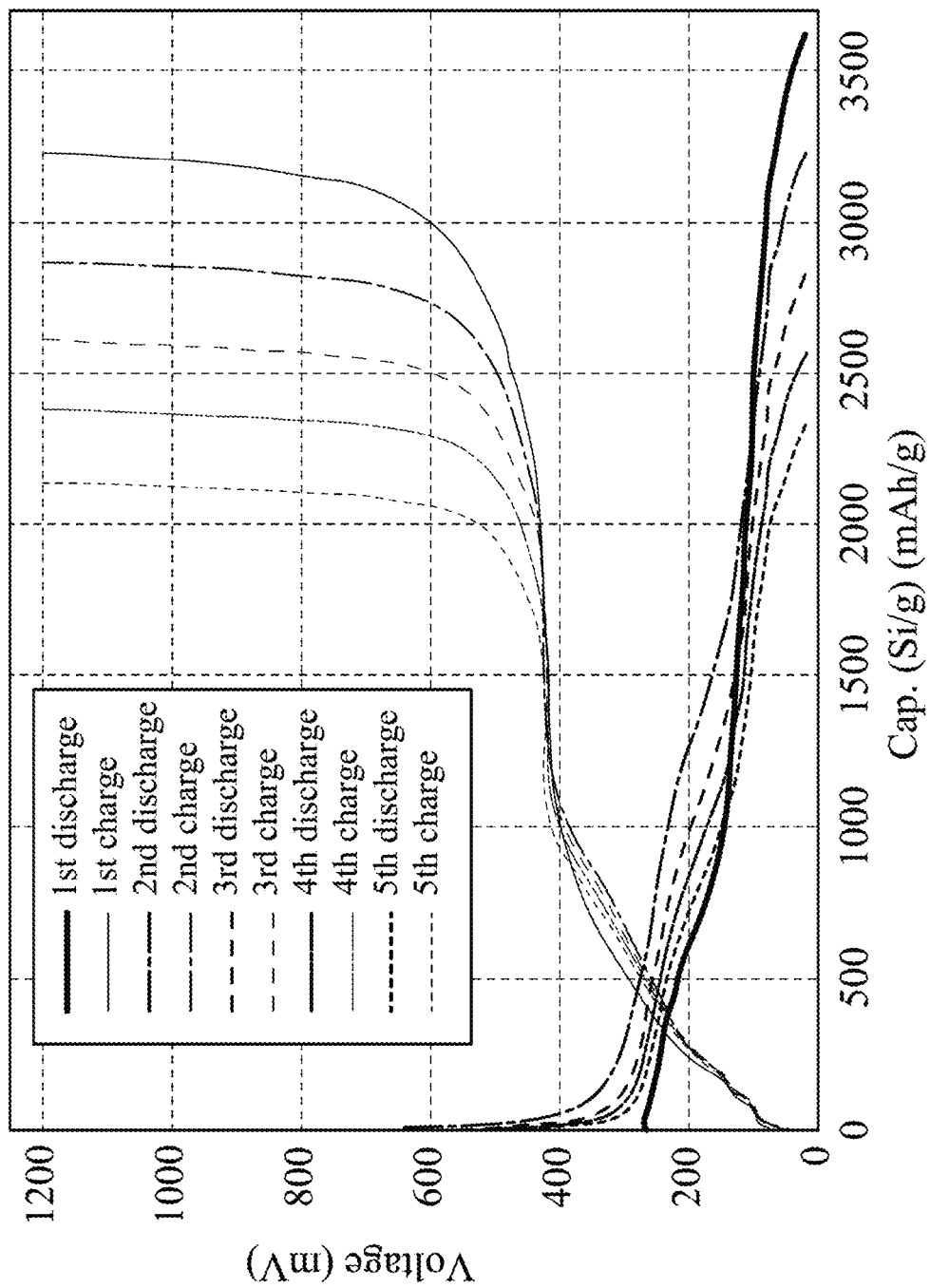
FIG. 7B shows voltage versus capacity of the 1st cycle to the 5th cycle of the lithium ion battery according to the 2nd example.
Figure 7C:
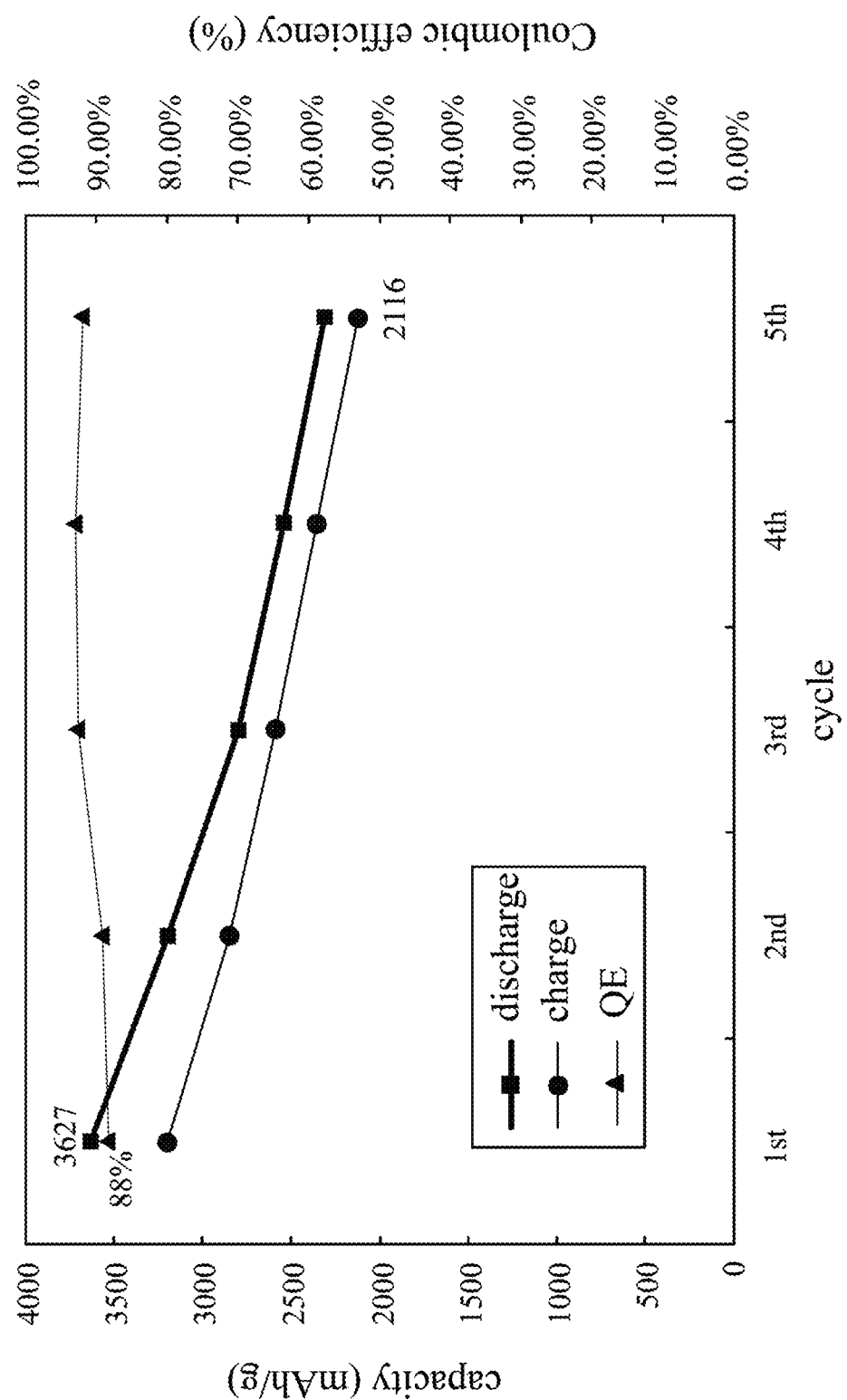
FIG. 7C shows Coulombic efficiency and charge/discharge capacity versus cycle number of the lithium ion battery according to the 2nd example.

FIG. 7A is a SEM photomicrograph of a silicon-containing negative electrode 700 of a lithium ion battery 600 according to the 2nd example of the present disclosure. FIG. 7B shows voltage versus capacity of the 1st cycle to the 5th cycle of the lithium ion battery 600 according to the 2nd example. FIG. 7C shows Coulombic efficiency and charge/discharge capacity versus cycle number of the lithium ion battery 600 according to the 2nd example.

In the 2nd example, based on 100 parts by weight of the silicon-containing negative electrode 700, an amount of the silicon flakes 500 is equal to 60 parts by weight. In FIG. 7B and FIG. 7C, the capacity of the lithium ion battery 600 is measured by a battery automation test system, and the model number of the battery automation test system is BAT-750B. In FIG. 7B and FIG. 7C, the charge-discharge tests are conducted for 5 cycles, and the charge-discharge tests are conducted under a fixed charge/discharge rate of 0.1 C, and a discharge cut-off voltage of 20 mV, and a charge cut-off voltage of 1200 mV. The relationships between voltage and time are recorded by a computer. In FIG. 7C, the QE value of the 1st cycle is 88%. The discharge capacity of the 1st cycle is up to 3627 mAh/g, and the charge capacity of the 5th cycle is still up to 2116 mAh/g.

Experiment Result of Lithium Ion Battery—3rd Example

Figure 8:
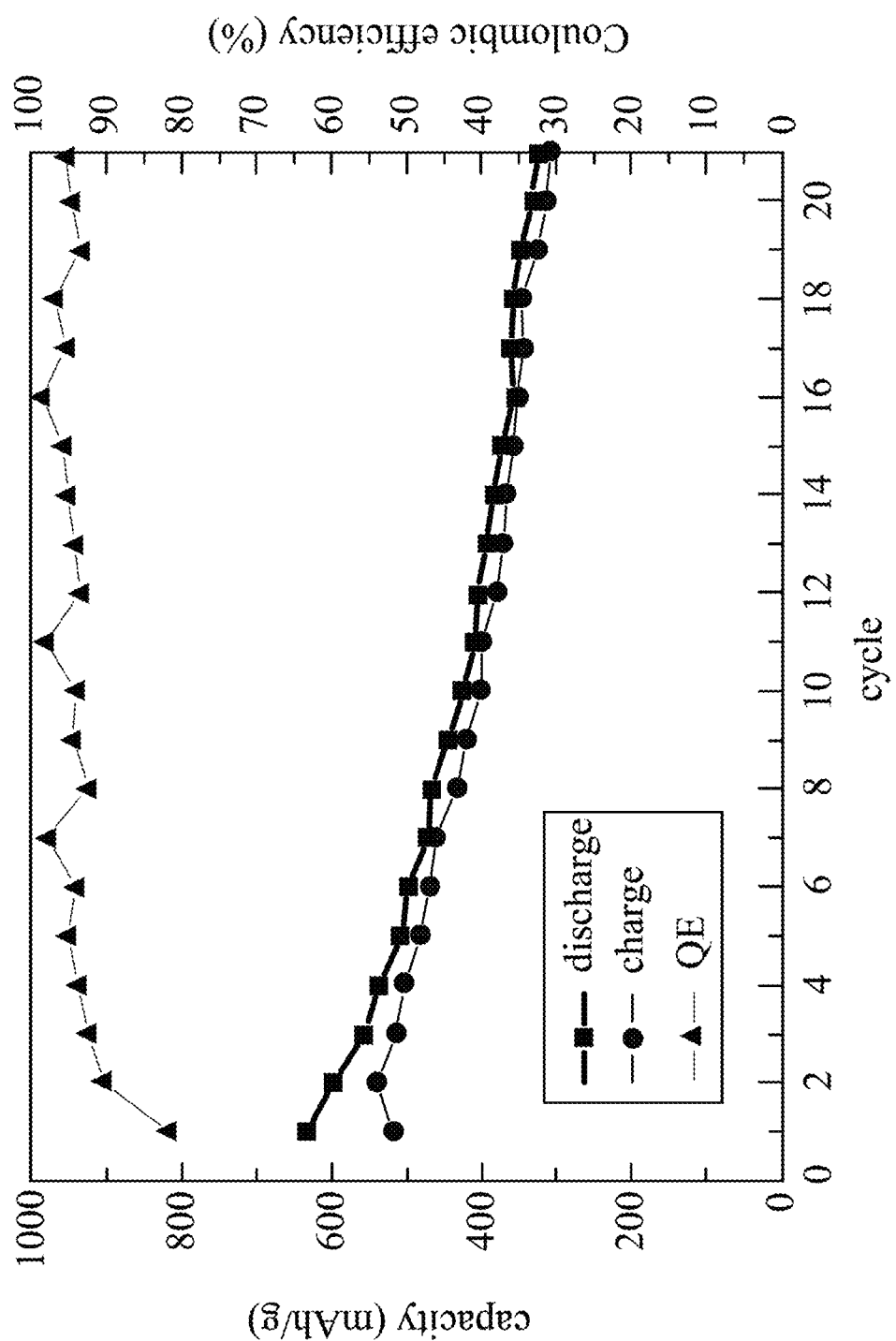
FIG. 8 shows Coulombic efficiency and charge/discharge capacity versus cycle number of the lithium ion battery according to the 3rd example.

FIG. 8 shows Coulombic efficiency and charge/discharge capacity versus cycle number of a lithium ion battery 600 according to the 3rd example. In the 3rd example, based on 100 parts by weight of the silicon-containing negative electrode 700, an amount of the silicon flakes 500 is equal to 15 parts by weight. Specifically, based on 100 parts by weight of the silicon-containing negative electrode 700, the amount of the silicon flakes 500 is equal to 15 parts by weight, an amount of an active material 710 (in the example, the active material 710 is carbon) is equal to 75 parts by weight, and an amount of a binder 730 is equal to 10 parts by weight. In FIG. 8, the capacity of the lithium ion battery 600 is measured by a battery automation test system, and the model number of the battery automation test system is BAT-750B. In FIG. 8, the charge-discharge tests are conducted under a fixed charge/discharge rate of 0.1 C, and a cut-off voltage of 20 mV~1.2 V. The relationships between voltage and time are recorded by a computer. In FIG. 8, the charge capacity of the 1st cycle is 517 mAh/g, the discharge capacity of the 1st cycle is 634 mAh/g, and the QE value of the 1st cycle is 81.5%. The charge capacity of the 2nd cycle is 540 mAh/g, the discharge capacity of the 2nd cycle is 598 mAh/g, and the QE value of the 2nd cycle is 90.3%. Furthermore, the charge capacity and the discharge capacity of the 21th cycle are all greater than 300 mAh/g. It is obvious that an excellent capacity can be provided by the lithium ion battery 600 according to the present disclosure after a number of cycles.

Experiment Result of Lithium Ion Battery—4th Example

Figure 9:
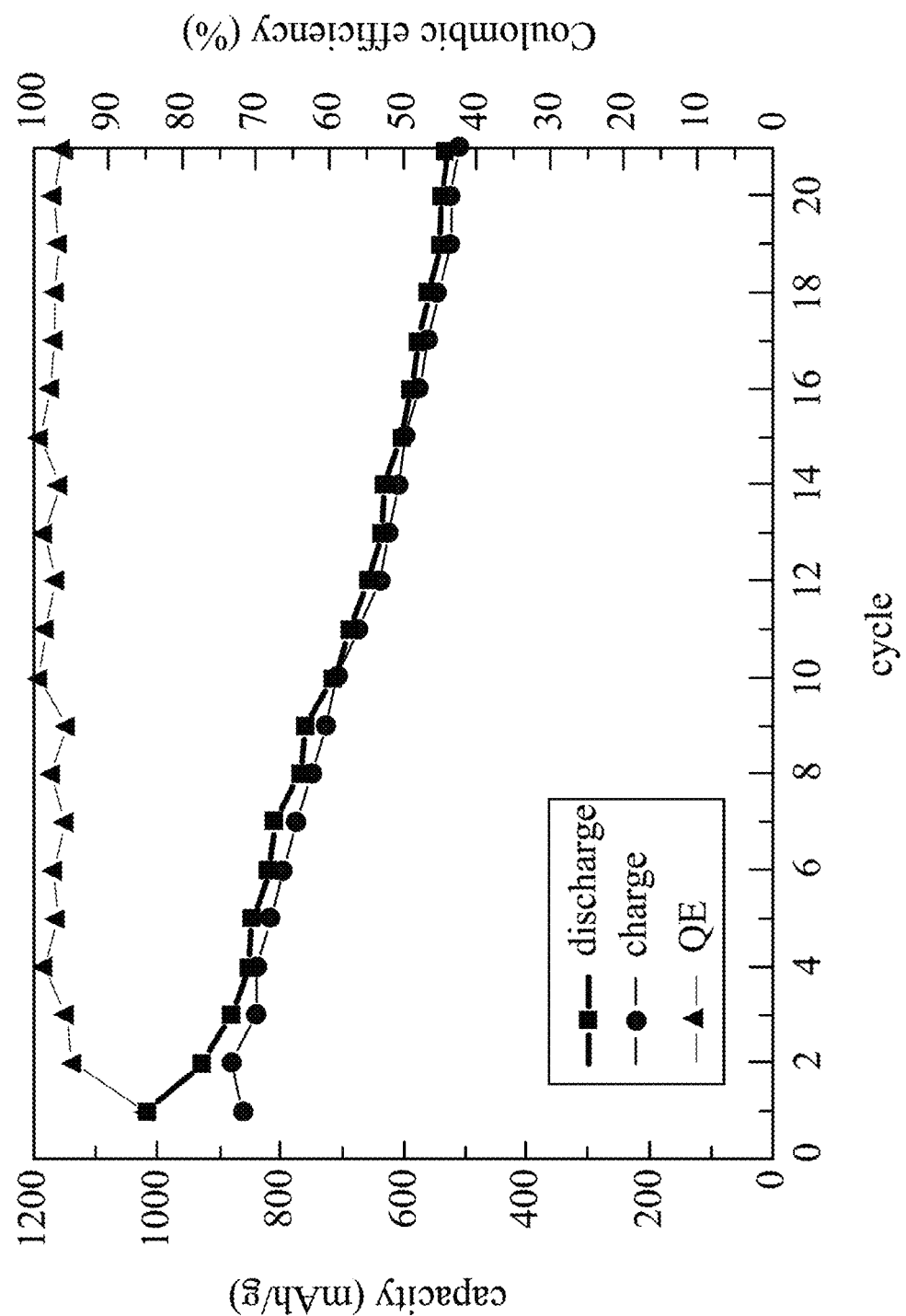
FIG. 9 shows Coulombic efficiency and charge/discharge capacity versus cycle number of the lithium ion battery according to the 4th example.

FIG. 9 shows Coulombic efficiency and charge/discharge capacity versus cycle number of a lithium ion battery 600 according to the 4th example. In the 4th example, based on 100 parts by weight of the silicon-containing negative electrode 700, an amount of the silicon flakes 500 is equal to 30 parts by weight. Specifically, based on 100 parts by weight of the silicon-containing negative electrode 700, the amount of the silicon flakes 500 is equal to 30 parts by weight, an amount of an active material 710 (in the example, the active material 710 is carbon) is equal to 60 parts by weight, and an amount of a binder 730 is equal to 10 parts by weight. In FIG. 9, the capacity of the lithium ion battery 600 is measured by a battery automation test system, and the model number of the battery automation test system is BAT-750B. In FIG. 9, the charge-discharge tests are conducted under a fixed charge/discharge rate of 0.1 C, and a cut-off voltage of 20 mV~1.2 V. The relationships between voltage and time are recorded by a computer. In FIG. 9, the charge capacity of the 1st cycle is 860 mAh/g, the discharge capacity of the 1st cycle is 1015 mAh/g, and the QE value of the 1st cycle is 84.7%. The charge capacity of the 2nd cycle is 878 mAh/g, the discharge capacity of the 2nd cycle is 927 mAh/g, and the QE value of the 2nd cycle is 94.7%. Furthermore, the charge capacity and the discharge capacity of the 21st cycle are all greater than 500 mAh/g. It is obvious that an excellent capacity can be provided by the lithium ion battery 600 according to the present disclosure after a number of cycles.

Experiment Result of Lithium Ion Battery~5th Example

Figure 10:
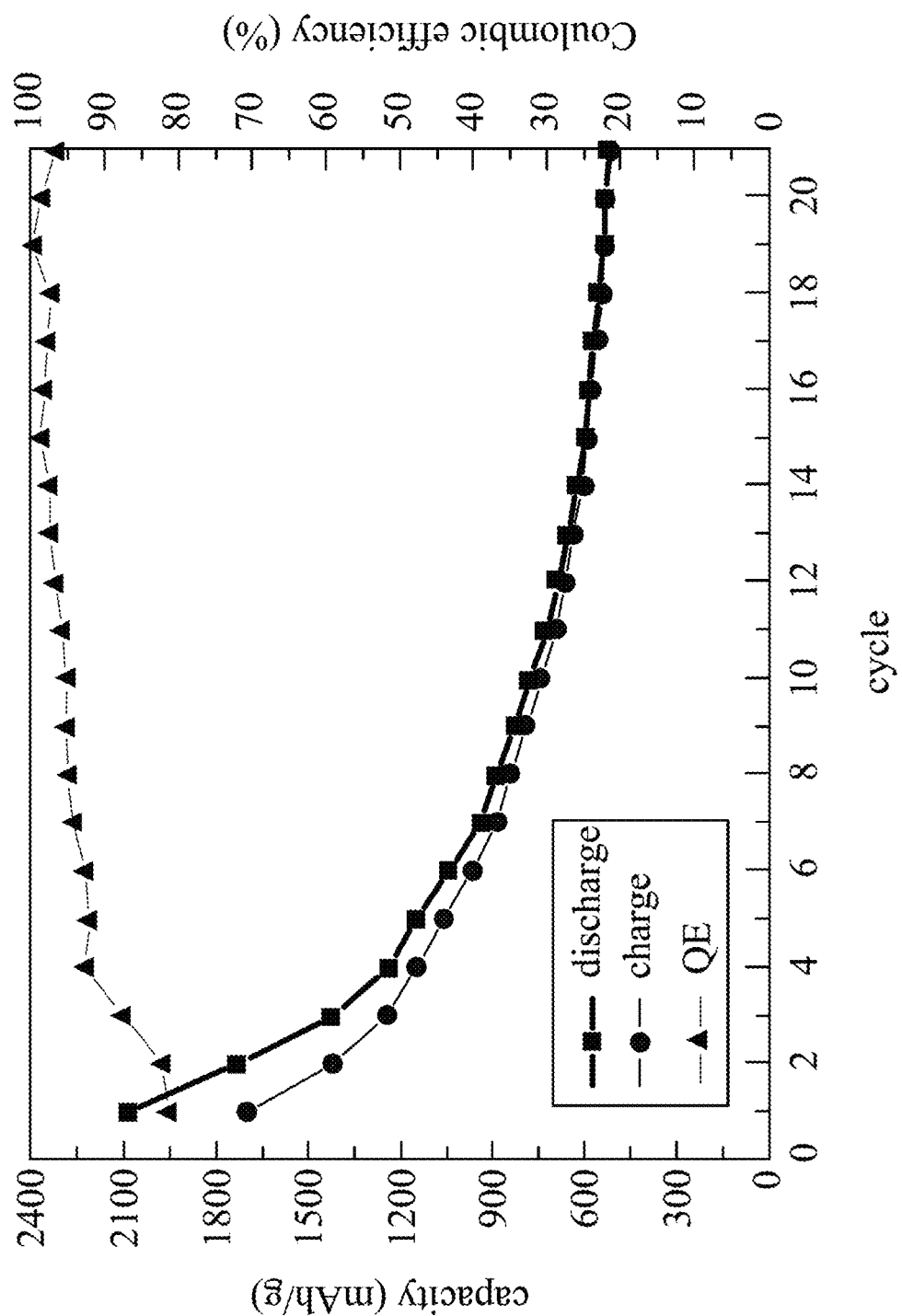
FIG. 10 shows Coulombic efficiency and charge/discharge capacity versus cycle number of the lithium ion battery according to the 5th example.

FIG. 10 shows Coulombic efficiency and charge/discharge capacity versus cycle number of a lithium ion battery 600 according to the 5th example. In the 5th example, based on 100 parts by weight of the silicon-containing negative electrode 700, an amount of the silicon flakes 500 is equal to 60 parts by weight. Specifically, based on 100 parts by weight of the silicon-containing negative electrode 700, the amount of the silicon flakes 500 is equal to 60 parts by weight, an amount of an active material 710 (in the example, the active material 710 is carbon) is equal to 30 parts by weight, and an amount of a binder 730 is equal to 10 parts by weight. In FIG. 10, the capacity of the lithium ion battery 600 is measured by a battery automation test system, and the model number of the battery automation test system is BAT-750B. In FIG. 10, the charge-discharge tests are conducted under a fixed charge/discharge rate of 0.1 C, and a cut-off voltage of 20 mV~1.2 V. The relationships between voltage and time are recorded by a computer. In FIG. 10, the charge capacity of the 1st cycle is 1726 mAh/g, the discharge capacity of the 1st cycle is 2086 mAh/g, and the QE value of the 1st cycle is 82.7%. The charge capacity of the 2nd cycle is 1419 mAh/g, the discharge capacity of the 2nd cycle is 1699 mAh/g, and the QE value of the 2nd cycle is 83.5%. Furthermore, the charge capacity and the discharge capacity of the 21st cycle are all greater than 600 mAh/g. It is obvious that an excellent capacity can be provided by the lithium ion battery 600 according to the present disclosure after a number of cycles.

Please refer to table 1.

TABLE 1

| | Example | | | | | |
|---|---|---|---|---|---|---|
| | 3rd | | 4th | | 5th | |
| | amount of the silicon flakes (wt %) | | | | | |
| | 15 | | 30 | | 60 | |
| cycle | 1st | 2nd | 1st | 2nd | 1st | 2nd |
| discharge capacity (mAh/g) | 634 | 598 | 1015 | 927 | 2086 | 1699 |
| charge capacity (mAh/g) | 517 | 540 | 860 | 878 | 1726 | 1419 |
| Coulombic efficiency (%) | 81.5 | 90.3 | 84.7 | 94.7 | 82.7 | 83.5 |

As shown in Table 1, the Coulombic efficiency of the 1st cycle doesn't decrease with the increase of the amount of the silicon flakes 500. When a negative electrode of a conventional lithium ion battery is added with spherical silicon powders in micron scale, the Coulombic efficiency of the 1st cycle decreases with the increase of the amount of the silicon flakes. It is obvious that the loss of the Coulombic efficiency of the 1st cycle can be suppressed by the flake shape and the particle sizes of the silicon flakes 500 according to the present disclosure. When the amount of the silicon flakes 500 is high as 60 parts by weight, the Coulombic efficiency of the 1st cycle can be maintain at the high value of 82.7%.

According to the aforementioned examples, the present disclosure has advantages as follows.

First, the silicon flakes 500 are manufactured by a mechanical method, so that the manufacturing costs are reduced, and an inconsistency of particle sizes of the silicon flakes 500 is generated accordingly.

Second, the problem of the volume expansion can be effectively resolved by the flake shape and the various particle sizes of the silicon flakes 500.

Third, the aggregation characteristic of the silicon flakes 500 can be reduced due to the inconsistencies of the particle sizes and shapes of the silicon flakes 500, so that the capacity and the life time of the lithium ion battery 600 can be increased effectively.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A silicon-containing negative electrode of a battery, comprising:
   a plurality of silicon flakes having various particle sizes, wherein the D10 and D50 of the silicon flakes are smaller than 1 micron, D10<D50, D90−D50>D10 and the silicon flakes are irregularly distributed in the silicon-containing negative electrode.

2. The silicon-containing negative electrode of the battery of claim 1, further comprising:
   at least one active material, wherein the active material comprises graphite, carbon, a metal element or a metal compound.

3. The silicon-containing negative electrode of the battery of claim 2, wherein an amount of the silicon flakes is equal to or greater than 5 parts by weight based on 100 parts by weight of the silicon-containing negative electrode, and the metal element is selected from the group consisting of tin, nickel, titanium, manganese, copper, magnesium and a combination thereof, and the metal compound is titanium carbide, silicon carbide or titanate.

4. The silicon-containing negative electrode of the battery of claim 2, wherein an amount of the silicon flakes is equal to or greater than 5 parts by weight based on 100 parts by weight of the silicon-containing negative electrode, the at least one active material comprises graphite or carbon, and the at least one active material further comprises the metal element and the metal compound, wherein the metal element is nickel and the metal compound is silicon carbide.

5. The silicon-containing negative electrode of the battery of claim 1, further comprising:
at least one binder bonding with the silicon flakes.

6. The silicon-containing negative electrode of the battery of claim 5, wherein the binder comprises CMC (carboxymethyl cellulose), SBR (styrene-butadiene rubber) or PAA (polyacrylic acid).

7. The silicon-containing negative electrode of the battery of claim 5, further comprising:
at least one conductive agent mixing with the silicon flakes.

8. The silicon-containing negative electrode of the battery of claim 1, wherein the D90 of the silicon flakes is equal or smaller than 2 μm.

9. The silicon-containing negative electrode of the battery of claim 1, wherein the D10 of the silicon flakes is equal or smaller than 300 nm.

10. The silicon-containing negative electrode of the battery of claim 1, wherein the D50 of the silicon flakes is between 700 nm to 800 nm.

11. The silicon-containing negative electrode of the battery of claim 1, wherein the particle sizes of the silicon flakes are smaller than 9 μm.

12. The silicon-containing negative electrode of the battery of claim 1, wherein a thickness of each of the silicon flakes is 50 nm to 200 nm.

13. A battery comprising the silicon-containing negative electrode of claim 1, and further comprising:
a positive electrode opposite to the silicon-containing negative electrode; and
a separator disposed between the silicon-containing negative electrode and the positive electrode.

14. The battery of claim 13, wherein the silicon-containing negative electrode further comprises at least one active material, wherein the active material comprises graphite, carbon, a metal element or a metal compound.

15. The battery of claim 14, wherein an amount of the silicon flakes is equal to or greater than 5 parts by weight based on 100 parts by weight of the silicon-containing negative electrode, and the metal element is selected from the group consisting of tin, nickel, titanium, manganese, copper, magnesium and a combination thereof, and the metal compound is titanium carbide, silicon carbide or titanate.

16. The battery of claim 14, wherein an amount of the silicon flakes is equal to or greater than 5 parts by weight based on 100 parts by weight of the silicon-containing negative electrode, and the at least one active material comprises graphite or carbon, and further comprises the metal element and the metal compound, wherein the metal element is nickel and the metal compound is silicon carbide.

17. The battery of claim 13, wherein the silicon-containing negative electrode further comprises at least one binder bonding with the silicon flakes, and at least one conductive agent mixing with the silicon flakes.

18. A battery comprising the silicon-containing negative electrode of claim 1, and further comprising:
an electrolyte used in the battery; and
a positive electrode opposite to the silicon-containing negative electrode.

19. The battery of claim 18, wherein the electrolyte is $LiPF_6$.

* * * * *